Figure 1:
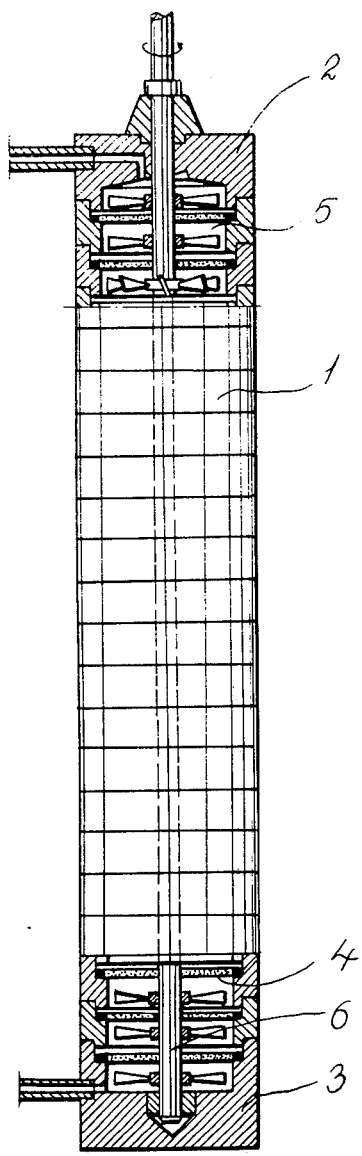

United States Patent [19]

Albertsson

[11] 3,897,414

[45] July 29, 1975

[54] METHOD OF FRACTIONATING A MIXTURE OF HIGH MOLECULAR SUBSTANCES OF DIFFERENT PHYSICAL CHARACTERISTICS

[75] Inventor: Per-Åke Albertsson, Umea, Sweden

[73] Assignee: Pharmacia Fine Chemicals AB, Uppsala, Sweden

[22] Filed: Nov. 3, 1972

[21] Appl. No.: 303,439

Related U.S. Application Data

[63] Continuation-in-part of Ser. No. 857,854, Sept. 15, 1969, abandoned.

[30] Foreign Application Priority Data

Sept. 12, 1969 Japan.................................. 44-72066

[52] U.S. Cl........................................... 260/211.5 R

[51] Int. Cl............................................. C07d 51/50
[58] Field of Search ............................. 260/211.5 R

[56] References Cited
UNITED STATES PATENTS

| | | | |
|---|---|---|---|
| 2,891,945 | 6/1959 | Stark.............................. | 260/211.5 R |
| 3,337,529 | 8/1967 | Laufer........................... | 260/211.5 R |
| 3,432,487 | 3/1969 | Levin............................ | 260/211.5 R |

*Primary Examiner*—Johnnie R. Brown
*Attorney, Agent, or Firm*—Fred Philpitt

[57] ABSTRACT

The present invention relates to a method in fractionating a mixture of high molecular substances of different physical characteristics by means of two immiscible aqueous and polymeric liquids (top phase and bottom phase liquid).

6 Claims, 3 Drawing Figures

METHOD OF FRACTIONATING A MIXTURE OF HIGH MOLECULAR SUBSTANCES OF DIFFERENT PHYSICAL CHARACTERISTICS

RELATED CASE

This application is a continuation-in-part of Ser. No. 857,854, filed Sept. 15, 1969, and now abandoned.

Such a method is previously known (vide Per-Åke Albertsson "Partition of Cell Particles and Macromolecules", Uppsala, 1960). In this method there is used a number of test tubes or similar containers, which are filled with top phase liquid and bottom phase liquid, normally in the volume ratio of 1:1. The substance mixture to be separated is introduced into a first test tube. The phases are then mixed and allowed to separate. Subsequent to achieving a complete phase separation, the top phase liquid is caused, by means of special devices, to run over into an adjacent test tube in the series, whereupon the working cycle is repeated a number of times until the desired separation has been reached. In practice, the time taken to obtain optimum separation is too lengthy, owing to the small difference in specific gravity of the liquids and because it is necessary to use high layers of the phase liquids. These disadvantages can be removed or considerably reduced by practising the present invention.

The invention is mainly characterized in that the mixture of the high molecular substances, dissolved or dispersed in one of the two phase liquids, is introduced into a column which is divided, by means of liquid permeable, fine-pore plates, into a number of chambers arranged storey-wise one above the other, and which each contain an equally large volume of top phase liquid and bottom phase liquid; that the top phase liquid and bottom phase liquid are mixed together for eluting the column in a first working stage so that the ingredient or ingredients which prefers or prefer the top phase liquid is or are transferred in said liquid and the ingredient or ingredients which prefers or prefer the bottom phase liquid is or are transferred in the latter; that in a second working stage the two phase liquids are permitted to separate and in a third working stage one of the phase liquids in each chamber is caused to pass through the nearest situated permeable plate without the other liquid leaving said chamber, whereupon the three working stages are repeated periodically a number of times, until at least the ingredient or ingredients which has or have the greatest affinity to the phase liquid which has passed through the permeable bottom has or have reached the end of the column, whereupon one or more fractions of the substance is recovered from the phase liquid which passes out from the chamber at the end below the third working stage of each period.

The method of the invention thus comprises two parts, the first part comprising charging the column with the substance mixture to be separated, while the second part comprises eluting the column, the latter part operation including three working stages.

In a first embodiment of the invention top phase liquid for eluting the column can be introduced from the bottom thereof during the third working stage of each period, and one or more fractions of the substance is recovered at the top of the column.

In another embodiment of the invention, bottom phase liquid for eluting the column can be introduced at the top thereof during the third working stage of each period, and one or more fractions of the substance is or are recovered at the top of the column.

According to a third embodiment of the invention, the two first-mentioned can be combined, top phase liquid being introduced to the bottom of the column and the bottom phase liquid introduced at the top of the column alternatively, the two phase liquids being caused to move in counter-current in relation to each other.

The present invention may be carried out in an apparatus which comprises a column which is composed of a number of annular elements, sealingly connected to each other and arranged in superimposed relationship and which together form a tubular main portion of the column; a top end member; a bottom end member; a liquid inlet in one of said end members; a liquid outlet in the other of said end members; and plates presenting passages of capillary dimensions, preferably porous plates, intended to serve as partition plates arranged in spaced relationship in the column, said plates dividing said column into a number of chambers with agitation in each chamber.

Figure 2:
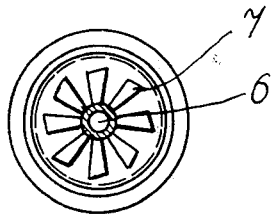
Figure 3:
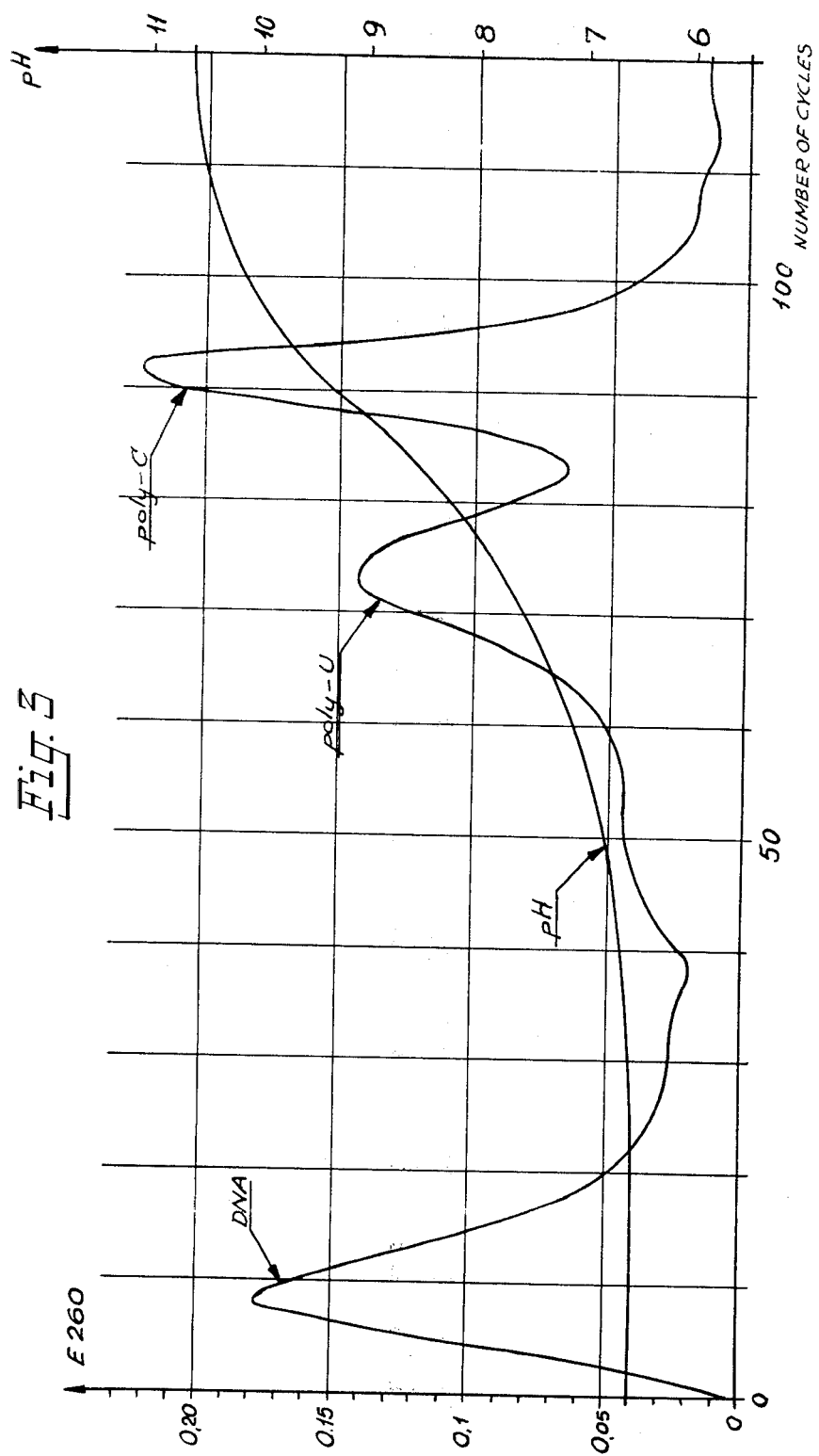

The invention will now be described with reference to the accompanying drawing, whereupon other characteristic features of the invention will be disclosed in conjunction therewith. In the drawing, FIG. 1 shows an apparatus for carrying out the method of the invention, partly in longitudinal section;

FIG. 2 shows the same apparatus in section perpendicular to the longitudinal direction thereof; and FIG. 3 is a graph representative of the example 1.

The apparatus includes a number of annular elements 1 placed storey-wise one above the other and which together form the major part of a column. The column of elements is bordered at the top by top end member 2 and at the bottom by a bottom end member 3. Each annular element 1 presents at the top an annular groove on the inside and at the bottom a corresponding groove on the outside. The vertical defining wall in each groove extends parallel with the longitudinal direction and the horizontal defining wall perpendicular to the longitudinal direction. The groove at the top of each element forms a space in which the non-removed portion of the lower portion of the over-lying element projects. Thus, the column is in this way well supported longitudinally. Because the groove at the bottom of an element is shorter in length in the longitudinal direction of the column than the groove at the top of an element an annular groove-like space is formed between two elements, which forms a seating for a porous plate 4. Each plate in the column defines a chamber 5. Through all chambers is passed a vertical shaft 6, which is mounted at both ends and adapted for rotation by means of a motor (not shown). Provided in each chamber is an agitator 7, the construction of which can be seen in FIG. 2.

The annular element presents the advantage that it can be used to erect columns of different heights.

Examples of high molecular weight substances which may be employed in the separation method of the present invention are:

whole cells such as bacteria, e.g. *Escherichia coli*, *Sarcina flava*, *Micrococcus albus* and *Bacillus megaterium*; algae, e.g. *Chlorella pyrenoidosa*; blood cells, e.g. erythrocytes, reticulocytes, leucocytes and blood platelets;

cell membranes such as e.g. cell surface membranes from L-cells;

cell organelles, e.g. chloroplasts and mitokondria; viruses, e.g. polio virus types 1 and 2, ECHO virus.

Biopolymers such as proteins, e.g. phycoerythrin, lysozyme ribonuclease, serum albumin, ovalbumin, transferrin and hemoglobin; nucleic acids and polynucleotides, e.g. native DNA, denatured DNA, polyadenylic acid, polyuridylic acid, polycytidylic acid and polyinosinic acid.

Examples of two-phase systems of aqueous and polymer containing liquids are:

dextran, water-soluble copolymer of sucrose and epichlorohydrin (Ficoll)/water, dextran/hydroxypropyl dextran/water, polyethylene glycol/dextran sulphate/water, charged polyethylene glycol/dextran/water, dextran/polyethylene glycol/water, polypropylene glycol/methoxypolyethylene glycol/water, polypropylene glycol/polyethylene glycol/water, polypropylene glycol/polyvinyl alcohol/water, polypropylene glycol/polyvinyl pyrrolidone/water, polypropylene glycol/hydroxypropyl dextran/water, polypropylene glycol/dextran/water, polyethylene glycol/polyvinyl alcohol/water, polyethylene glycol/polyvinyl pyrrolidone/water, polyethylene glycol/Ficoll/water, polyethylene glycol/soluble starch/water, polyethylene glycol/glycogen/water, polyvinyl alcohol/methyl cellulose/water, polyvinyl alcohol/hydroxypropyl dextran/water, polyvinyl alcohol/dextran/water, polyvinyl pyrrolidone/methyl cellulose/water, polyvinyl pyrrolidone/dextran/water, methyl cellulose/hydroxypropyl dextran/water, methyl cellulose/dextran/water and ethylhydroxyethyl cellulose/dextran/water.

EXAMPLE 1

The column used was one constructed in accordance with the aforegoing and containing 21 chambers, each annular element being made of polymethyl methacrylate. The chambers were separated by plates of porous plastic. The column was placed in a refrigerator at a temperature of from 4° to 5°C.

A two-phase system was prepared by dissolving 5% by weight dextran of molecular weight 500,000 and 4% by weight polyethylene glycol of molecular weight 6000 in a phosphate buffer containing 8 mM $NaH_2PO_4$ and 2 mM $Na_2HPO_4$.

The phase system was shaken vigorously, to emulsify one phase in the other. The column was filled from beneath with the phase mixture whilst agitating in each chamber, to force all air from the column. When the entire column was completely filled, filling was interrupted and the agitator stopped, whereupon top and bottom phase separated in each chamber.

The thus prepared column was used to separate a mixture of different nucleic acids. A sample of 1 ml containing DNA (desoxyribonucleic acid), polycytidylic acid (poly-C) and polyuridylic acid (poly-U), total approximately 0.5 mg nucleic acid, were dissolved in top phase liquid injected into the bottom of the column for 6 seconds. The column was then eluted in sequences by repeating the following cycles of three working stages 120 times.

1. agitation in each chamber for 18 seconds at 60 rpm.
2. phase separation in each chamber for 5 minutes.
3. injection into the bottom of the column of 0.55 ml top phase liquid for 6 seconds. The same quantity of liquid left the column at the top thereof.

The fractions of top phase liquid which thus left the column at the top were analysed with regard to their content of nucleic acid, by determining extinction at 260 nm (E 260). In order to vary the distribution constant of the various nucleic acids between the two phases, and thereby improve the separation result, the composition of the phosphate buffer was varied during the eluting period. During the first 2 cycles this buffer was 8 mM $NaH_2PO_4$ + 2 mM $Na_2HPO_4$, during the subsequent 20 cycles 5 mM $NaH_2PO_4$ + 5 mM $Na_2HPO_4$, during the subsequent 18 cycles 10 mM $Na_2HPO_4$ and during the remaining cycles 5 mM $Na_2HPO_4$ + 5 mM $Na_3PO_4$. The result was a pH-gradient in the column which is reproduced in FIG. 3, and which also shows the separation result.

EXAMPLE 2

The column used was one of the same construction as that of Example 1 but containing 27 chambers or elements.

The column was charged with dextran/polyethylene glycol in 0.01 M potassium phosphate buffer, pH 7.0, at 20°C (dextran 7 % w/w, molecular weight 500,000; polyethylene glycol 4.4 % w/w, molecular weight 6000). The ratio of top phase to bottom phase, $V_T/V_B$, was 1:1 and each cell held 1.1 ml of each of the two phases.

A sample of phycoerythrin in 0.55 ml top phase and bovine serum albumin in another volume of 0.55 ml top phase was introduced into the bottom element. The column was eluted with 130 successive volumes of 1.1 ml top phase liquid introduced in the bottom of the column. The fractions obtained were diluted 5 times with distilled water before the extinction was measured at 495 nm and 280 nm.

The proteins were well separated. Phycoerythrin was eluted as a peak having its maximum at fraction number 35 and bovine serum albumin as a peak having its maximum at fraction number 75.

In another test the components were run separately on the two phase column. The protein peaks were eluted at the same volume and with the same width as in case of separating the mixture thereof, a fact indicating that the components separate and are fractionated independently.

EXAMPLE 3

The column used was one of the same construction as the ones of Examples 1 and 2 but containing 53 elements.

The two-phase system was the same system as that of Example 1, $V_T:V_B = 1:1$, temperature = 4°C, each cell holding 1.1 ml of each of the two phases.

A sample of desoxyribonucleic acid (DNA) in 0.55 ml top phase and ribonucleic acid (RNA) in another volume of 0.55 ml top phase was introduced into the bottom element. The column was eluted with 220 successive volumes of 1.1 ml top phase introduced in the bottom of the column. The fractions obtained were diluted 5 times with the buffer used in the column before the extinction was measured at 260 nm. The two different nucleic acids were clearly separated. DNA was eluted as a rather narrow peak having its maximum at about fraction number 58. The following peak was broader and had a maximum at fraction number 115 and contained RNA. Both substances behaved as expected and were apparently eluted independently.

EXAMPLE 4

A column according to Example 3 was charged with dextran/polyethylene glycol in 0.05 M sucrose, 0.09 M sodium phosphate buffer pH = 7.0 at 20°C (dextran 5 % w/w, molecular weight 500,000; polyethylene glycol 4.4 % w/w, molecular weight 6000). Each element contained 1.4 ml top phase and 0.8 ml bottom phase, total 2.2 ml.

The sample to be separated consisted of two volumes of 0.55 ml top phase. Each contained erythrocytes from an individual cow ($A_{540}^{1\ cm} = 73$ for cow No. 1 and $A_{540}^{1\ cm} = 70$ for cow No. 2). The sample was introduced into the bottom element and the column was eluted with 250 successive volumes of top phase to remove all the material in the sample from the column. Each fraction was centrifuged, washed, lysed and again centrifuged before the extinction was measured at 540 nm (haemoglobin).

Three different peaks could be detected, peak 1 having a maximum at about fraction number 80, peak 2 at about fraction number 135, peak 3 at about fraction number 185. (Peaks 2 and 3 were broad whereas peak 1 was narrow and completely separated from the two others. In similar experiments with samples from other individuals often only two peaks are obtained. It is not clear if peaks 2 and 3 differ chemically from one another.)

The distribution of cells from respective isolated fractions is quite different, even after the passage through the column, if the cells are washed and redistributed in a new phase system. This illustrates that the column is suitable for cell separations, and that cells are not damaged during transport through the column. The reason for the different distributions of erythrocytes from different individuals is not known. It probably depends on different antigen-antibody relations.

EXAMPLE 5

A column like the ones of the foregoing Examples but containing only 14 cells or elements was used for the fractionation of chloroplasts in a phase system of 5 % w/w dextran (molecular weight 500,000), 3.5 % w/w polyethylene glycol (molecular weight 6000), 9.2 % w/w sucrose and 5 mM potassium phosphate buffer pH 7.8. The experiment was performed at 4°C with a $V_T:V_B$ of 1:1. The sample was applied from the bottom of the column in 1.1 ml top phase containing washed chloroplasts corresponding to 1.5 mg chlorophyll. The column was eluted in 65 steps until the experiment was interrupted. There was still material left in the column which later was eluted in somewhat bigger fractions. This material was enriched at an interface from which samples were taken for examination by phase contrast microscopy.

The experiment clearly showed the presence of different classes of chloroplasts.

All samples of chloroplasts were diluted approximately 5 times before measuring. One peak having a maximum at fraction number 32 was obtained.

A larger column with 53 cells was prepared with the same phase system as above at 4°C. In this case, however, $V_T:V_B$ was 1.4:0.8 instead of 1:1. A 1.1 ml sample was applied and 220 extraction steps were conducted before the experiment was interrupted. The samples were diluted 3 times and measured spectrophotometrically.

The chloroplasts were separated into 2 fractions of almost the same size maxima at tube 105 and tube 135. A smaller amount of material was still left in the column, which, after accelerated elution, was quite different by microscopic investigation.

These two experiments illustrate how chloroplasts can be fractionated into different classes, and that it is possible to isolate specific fractions.

What I claim is:

1. In the known method for fractionating a mixture of high molecular substance selected from the group consisting of cell particles and macromolecules of different physical characteristics by contacting said mixture with two immiscible aqueous liquids, the improvement which comprises
   a. providing a plurality of vertically arranged fractionating zones that includes two end fractionating zones (consisting of a top fractionating zone and a bottom fractionating zone) and at least one intermediate fractionating zone,
   b. each of said fractionating zones being in communication with the next adjacent fractionating zone by virtue of a liquid-permeable, fine pore plate,
   c. filling all of the fractionating zones of said column with two immiscible aqueous liquids,
   d. agitating the thus introduced two immiscible aqueous liquids contained within the fractionating zones of said column,
   e. discontinuing the agitation set forth in step (d) and allowing the two immiscible aqueous liquids that are present in each fractionating zone to separate into a top phase liquid and a bottom phase liquid,
   f. introducing into one of the fractionating zones a mixture of high molecular weight substances selected from the group consisting of cell particles and macromolecules that have been dissolved or dispersed in one of the aforementioned two phase liquids,
   g. agitating the phases in each fractionating zone,
   h. thereafter allowing the phases in each fractionation zone to again separate into a top phase liquid and a bottom phase liquid,
   i. introducing into one of the end fractionating zones a quantity of one of the two phase liquids large enough to cause at least some corresponding phase liquid that is already present in each fractionating zone to be displaced into the next adjacent fractionating zone, but not large enough to cause the other of said two phase liquids present in each fractionating zone to be displaced to the same next adjacent fractionating zone, and collecting from the other of said end fractionating zones approximately the same quantity of phase liquid that was introduced,
   j. agitating the phases in each fractionating zone,
   k. thereafter allowing the phases in each fractionation zone to separate into a top phase liquid and a bottom phase liquid,
   l. repeating the sequence of steps (i) through (k) until the desired separation is reached and
   m. collecting at least one fraction of separated components from the other of said end fractionating zones.

2. A method according to claim 1 wherein in step (i) a quantity of the top phase liquid is introduced into the bottom fractionating zone and the collection of a liquid as set forth in step (i) is from the top fractionating zone.

3. A method according to claim 1 wherein in step (i) a quantity of the bottom phase liquid is introduced into the top fractionating zone and the collection of a liquid as set forth in step (i) is from the bottom fractionating zone.

4. A method according to claim 3 wherein in step (i) a quantity of the top phase liquid is introduced into the bottom fractionating zone in alternation with the introduction of the bottom phase liquid into the top fractionating zone and the collection of the upwardly displaced liquid is from the top fractionating zone.

5. A method for fractionating the components of nucleic acid which comprises
   a. providing a plurality of vertically arranged fractionating zones that includes two end fractionating zones (consisting of a top fractionating zone and a bottom fractionating zone) and at least one intermediate fractionating zone,
   b. each of said fractionating zones being in communication with the next adjacent fractionating zone by virtue of a liquid-permeable, fine pore plate,
   c. filling all of the fractionating zones of said column with a two-phase system prepared by dissolving 5% by weight of dextran of moleuclar weight of 500,000 and 4% by weight polyethylene glycol of molecular weight 6000 in a phosphate buffer containing 8 mM $NaH_2PO_4$ and 2 mM $Na_2HPO_4$,
   d. agitating the thus introduced two-phase system within the fractionating zones of said column,
   e. discontinuing the agitation set forth in step (d) and allowing the agitated two-phase system that is present in each fractionating zone to separate into a top phase liquid and a bottom phase liquid,
   f. introducing into the lower fractionating zone a mixture of different nucleic acids that have been dissolved or dispersed in the top phase liquid,
   g. agitating the phases in each fractionating zone,
   h. thereafter allowing the phases in each fractionation zone to again separate into a top phase liquid and a bottom phase liquid,
   i. introducing a quantity of the top phase liquid into the bottom fractionating zone so as to thereby cause at least some of the top phase liquid that is already present each fractionating zone to be displaced into the next adjacent higher fractionating zone, but not large enough to cause the bottom phase liquid present in each fractionating zone to be displaced to the next adjacent higher fractionating zone, and collecting from the top fractionating zone approximately the same quantity of top phase liquid that was introduced into said bottom fractionating zone,
   j. agitating the phases in each fractionating zone,
   k. thereafter allowing the phases in each fractionation zone to separate into a top phase liquid and a bottom phase liquid,
   l. repeating the sequence of steps (i) through (k) until the desired separation is reached, and
   m. collecting at least one fraction of separated components from the top fractionating zone.

6. In the known method for fractionating a mixture of substances of different physical characteristics and selected from the group consisting of whole cells, cell membranes, cell organelles, viruses and biopolymers by contacting said mixture with a two-phase system selected from the group consisting of dextran/water-soluble copolymer of sucrose and epichlorohydrin/water, dextran/hydroxypropyldextran/water, polyethylene glycol/dextran sulphate/water, charged polyethylene glycol/dextran/water and dextran/polyethylene glycol/water, forming two immiscible aqueous liquids the improvement which comprises
   a. providing a plurality of vertically arranged fractionating zones that includes two end fractionating zones (consisting of a top fractionating zone and a bottom fractionating zone) and at least one intermediate fractionating zone,
   b. each of said fractionating zones being in communication with the next adjacent fractionating zone by virtue of a liquid-permeable, fine pore plate,
   c. filling all of the fractionating zones of said column with a two-phase system of the group indicated above comprising two immiscible aqueous liquids,
   d. agitating the thus introduced two immiscible aqueous liquids contained within the fractionating zones of said column,
   e. discontinuing the agitation set forth in step (d) and allowing the two immiscible aqueous liquids that are present in each fractionating zone to separate into a top phase liquid and a bottom phase liquid,
   f. introducing into one of the fractionating zones a mixture of substances, selected from the group indicated above that have been dissolved or dispersed in one of the aforementioned two-phase liquids,
   g. agitating the phases in each fractionating zone,
   h. thereafter allowing the phases in each fractionation zone to again separate into a top phase liquid and a bottom phase liquid,
   i. introducing into one of the end fractionating zones a quantity of one of the two phase liquids large enough so as to cause at least some corresponding phase liquid that is already present in each fractionating zone to be displaced into the next adjacent fractionating zone, but not large enough to cause the other of said two phase liquids present in each fractionating zone to be displaced to the same next adjacent fractionating zone, and collecting from the other of said end fractionating zones approximately the same quantity of phase liquid that was introduced,
   j. agitating the phases in each fractionating zone,
   k. thereafter allowing the phases in each fractionation zone to separate into a top phase liquid and a bottom phase liquid,
   l. repeating the sequence of steps (i) through (k) until the desired separation is reached, and
   m. collecting at least one fraction of separated components from the other of said end fractionating zones.

* * * * *